Patented Apr. 11, 1939

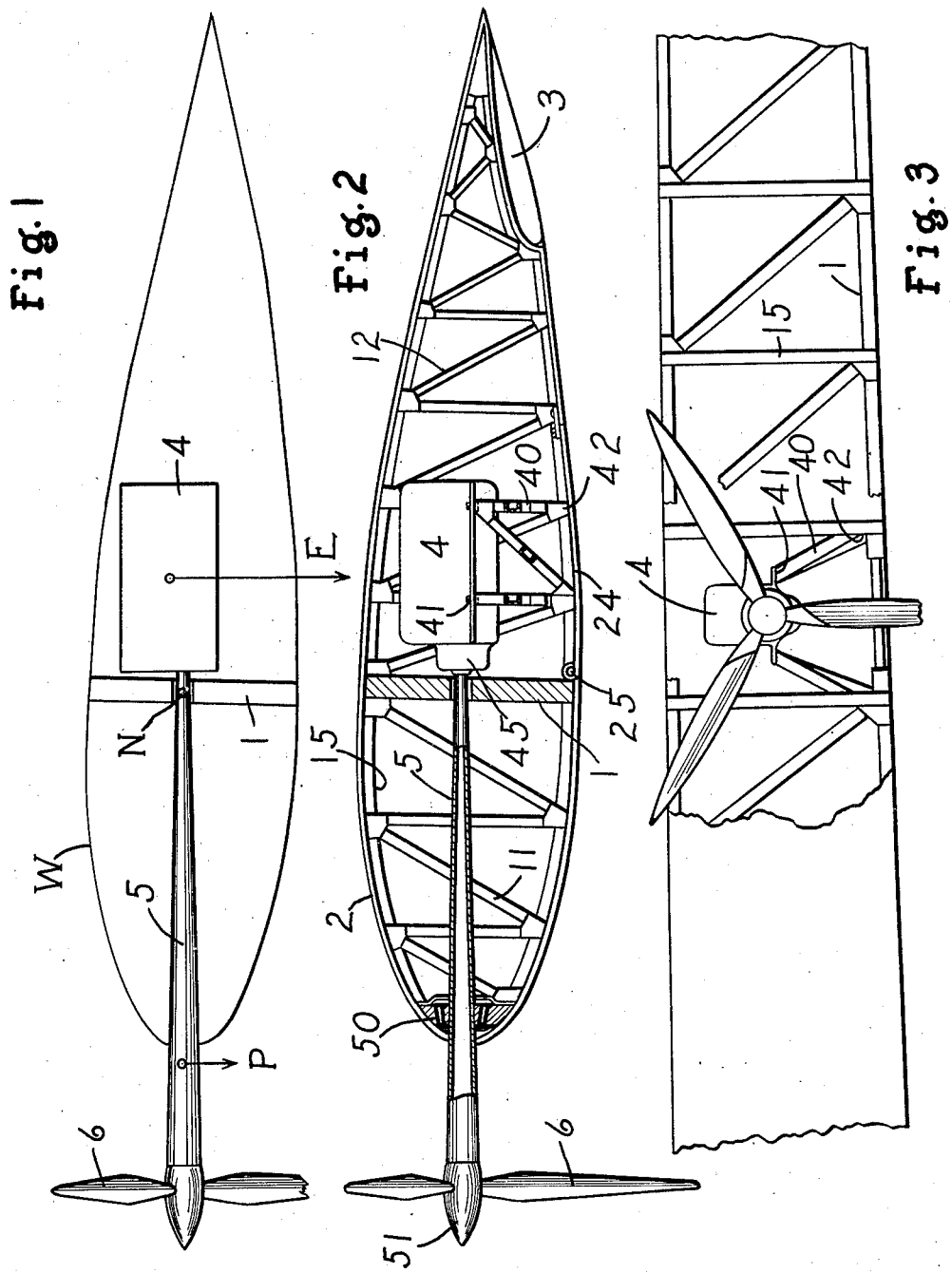

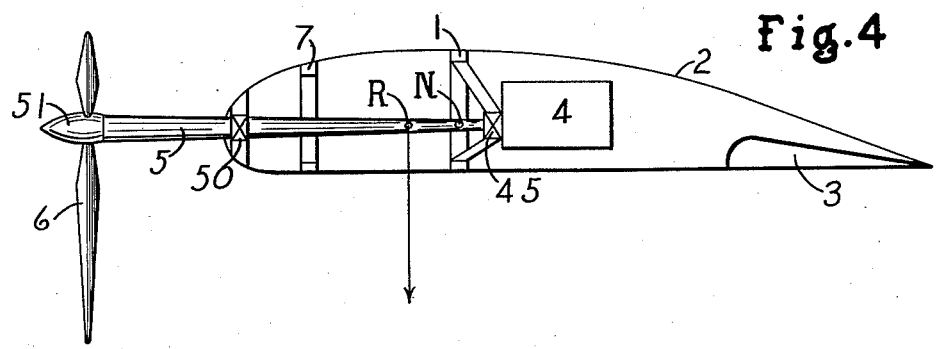
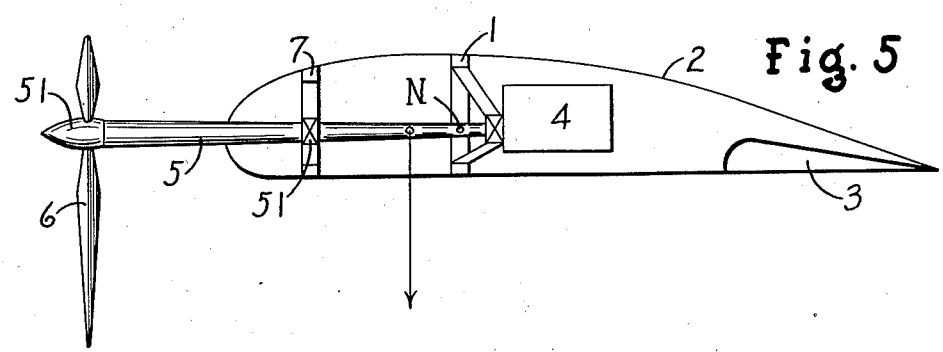
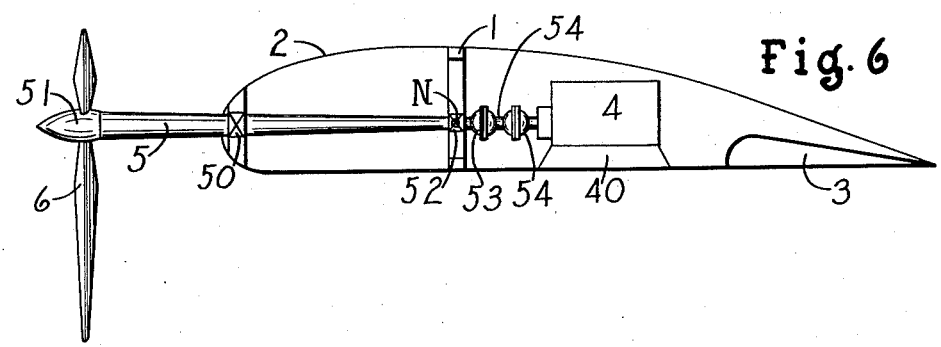

2,153,603

UNITED STATES PATENT OFFICE 2,153,603

AIRCRAFT POWER PLANT INSTALLATION

Edward C. Wells, Seattle, Wash., assignor to Boeing Aircraft Company, Seattle, Wash., a corporation of Washington Application April 2, 1938, Serial No. 199,638

6 Claims. (Cl. 244—55)

In multi-engine aircraft of the present-day type the engines are supported upon the wings. It is impractical and undesirable to locate the propellers in close proximity to the leading edge of the wing, and since it is therefore necessary to project them forwardly of the leading edge, it is common practice to employ a forwardly projecting nacelle framework or structure, whereon is supported not only the propeller and its shaft, but also the entire power plant. Such overhanging structures produce very appreciable unbalanced moments upon the wing structure whereon they are mounted, and the nacelle framework and the wing structure as well must be very materially strengthened, and the weight thereof increased, to resist such moments. With wings of any appreciable chord, this is likely to necessitate the employment of at least two main spars in the wing, rather than a single main spar, which single-spar construction is simpler to design because the spar is placed substantially coincident with the neutral spanwise axis of the wing, and which requires less weight; nevertheless with the wings of large chord, required for the large heavy airplanes of the present day and of the immediate future, and by reason of the necessity of projecting the propeller disk well in advance of the leading edge of the wing, by reason of the increasing weight of the engines, by reason of the higher speeds and greater stresses imposed upon the wing, and other such matters inherent in modern design trends, it is becoming increasingly difficult and undesirable to support the engines in the manner in which they have been heretofore supported.

Engines have been mounted above and below the wings, but here other difficulties ensue, because of such factors as increased drag of the engine supports and fairings, because of lack of coincidence or increased spacing of the line of thrust from the longitudinal axis of the airplane, and the like. It has also been proposed to dispose engines within the leading edge of a wing, though forward of main spars, and to extend a propeller shaft through this leading edge, to support a propeller in advance of the leading edge, but such structures have still produced unbalanced moments upon the wing structure itself, have interrupted the primary bracing within the leading edge, and have not proven practical in operation.

It is the major object of the present invention to provide an integral coordinated structure of the wing, the engine, the propeller, and the propeller shaft, all so arranged and disposed as to produce a minimum of drag and a maximum of efficiency, and so coordinated with each other and with the remainder of the airplane that the moments produced are all balanced or neutralized susbtantially along the neutral axis of the wing, whether these moments be produced by forces acting upon the wing per se or arise from moments acting upon the engine and propeller and shaft assembly. It is also an object to incorporate such an arrangement within a wing of simplified construction, by the use of this arrangement to permit the design, even in a wing of large chord, of a single-spar wing, or a wing having but one main spar.

An associated object is to devise a structure, more particularly a power plant mounting, which will produce the minimum of unbalanced forces, and which will require the minimum of weight and strength to support it.

It is a further object to facilitate servicing such an airplane, and in particular the dismounting of the engine thereof, by so mounting the engine, which is carried within the wing, that the entire power plant may be readily detached from the airplane and removed through a suitable opening that may be made in the wing, and a complete new power plant may be installed to replace the one removed. In addition, it is an object to provide such a mounting which will facilitate attention to the power plant during long flights.

Other objects, and particularly such as refer to details of the invention, will be ascertained as this specification progresses.

My invention comprises the novel assembly of the several parts, all as shown in the accompanying drawings, and as will be described in this specification, and more particularly defined by the claims which terminate the same, the invention residing most particularly in the relative combination and arrangement of the parts in relation to each other.

In the accompanying drawings my invention is disclosed in a typical form, it being understood that the constructions chosen and disclosed are for purposes of illustration of the principle only.

Figure 1 is a diagram of the forces acting upon a typical arrangement of the power plant, and their relationship to the wing structure.

Figure 2 is a chordal section of a wing, taken along the propeller axis, and illustrating the relation and mounting of the several parts.

Figure 3 is a front elevation of such an installation, with parts broken away for better illustration.

Figure 4 is a diagram similar to Figure 1, showing a modified arrangement, and Figure 5 is a similar diagram showing a further slight modification.

Figure 6 is a similar diagram, showing a different arrangement.

The airplane wing as shown herein is formed preferably with a single main spar 1 which is located in or adjacent the neutral spanwise axis of the wing as a whole. Carried upon or reacting from such a spar are conventionally shown the primary internal trussing 11 forwardly of the spar, and the secondary trussing 12 placed to the rear of the spar, each including rib elements 15 spaced apart lengthwise of the spar, the whole constituting a skeleton framework upon which a skin 2 is placed. The skin, also, may constitute part of the bracing. The details of such structure are not of concern here, and may vary widely. The wing may also have various accessories, as is indicated by the trailing edge flap 3.

It will be understood that the forces acting upon the wing in flight produce stresses in the wing, the strongest forces being applied to the leading edge, which stresses are resisted and substantially neutralized or balanced in the neutral axis of the wing, indicated in Figures 1, 4, 5, and 6 at N, and the spar 1 substantially coincides with this neutral axis. It is not to be inferred that the wing may not have secondary spars, and such are shown in Figures 4 and 5 at 7; such secondary spars, however, are part of the bracing or power plant supporting means, and the main spar 1 still resists substantially all moments about the neutral spanwise axis of the wing, adjacent which axis the main spar is located. The secondary spars 7 may extend only through a portion of the length of the wing, and may not be carried to or through the fuselage. They may, however, be similar to the spar 1 in function and in arrangement relative to the airplane structure, and the wing's neutral axis may lie between the two spars, and yet the principles of my invention, as hereinafter pointed out, may still be employed, and the advantages thereof attained.

Within the wing, behind the main spar and the neutral axis, a space is left to receive an engine 4. This engine is supported from the wing structure in any suitable manner, as for instance by trusses or elements 40 engaged with the engine at 41, and with the wing structure at 42. Projecting forwardly from the engine and rotated thereby is a propeller shaft 5, which in the arrangement of Figures 1 and 2 has a bearing at 45 in or adjacent the engine 4, and which may be further supported in a bearing 50 at or within the leading edge of the wing W. This bearing at 50, or the bearing at 45, or both, may be formed as a combined rotative and thrust bearing, the bearing 50 being so illustrated. In order to accommodate the overhanging weight of the propeller 6, which is carried upon the forwardly projecting end of the shaft 5, well forward of the wing's leading edge, the shaft may be tapered throughout the greater portion of its length, as shown in Figures 1, 2, 4, 5, and 6. That portion of the shaft which projects forwardly of the leading edge, to the extent necessary to reduce interference to a minimum, is preferably of the smallest size possible consistent with strength required, and is not appreciably faired into the leading edge nor provided with any external structural housing means. The extreme forward end of the propeller shaft may be provided with a tapered or streamlined spinner 51, which may conveniently house portions of pitch-adjusting means (not shown).

It may be pointed out here that the propeller shaft is readily detachable from the engine 4, and that the engine is supported immediately above an opening in the lower skin of the wing, closed by an access door 24, supported hingedly, for instance, as indicated at 25, and normally closed. However, whenever it is desired to remove the engine the door 24 may be opened, and the engine may be detached from its supports 40, and with the latter moved sufficiently out of the way the engine may be lowered through the opening left by the door 24, and a new engine may be installed in its place.

It may also be noted here that the axis of the propeller shaft 5 does not precisely coincide with nor lie parallel to the chord of the wing, but the wing is set at a slight angle of incidence, although this in itself is no part of my invention.

Reference is now made to Figure 1. The engine 4, the propeller shaft 5, and the propeller 6 may be considered as a single power plant unit which may be balanced (as a single beam or as an assembly of separate units) about a point of support intermediate its ends. Thus the engine 4 produces a moment E, and the propeller shaft and propeller produce a moment P, these two moments being balanced about a neutral point. By proper design and arrangement of the parts this neutral point is made to coincide as nearly as may be practicable with the neutral axis N, which is also the center about which stresses and moments on the wing are neutralized. Thus in effect the power plant assembly is balanced about the neutral axis N; therefore all loads on the wing in flight, and the loads of the engine, shaft and propeller combination are all centralized and balanced about the single axis which, in the special case of Figure 1, substantially coincides with the single main spar of the wing. In consequence the strength and weight of the assembly as a whole may be materially reduced over that which would be required by present practice with the engine and propeller mounted forwardly of the leading edge of the wing.

The engine might be mounted forwardly of the neutral axis and of the spar, but in such an installation the propeller shaft should be extended rearwardly and the airplane would then become a pusher. However, it is undesirable to locate the engine forward of the spar, since the primary trussing 11 is necessarily of stronger and heavier construction than the secondary trussing 12, and it is undesirable to interrupt this primary trussing, such as would normally be required were the engine to be located forwardly of the spar 1. This is a further reason why prior constructions, with the engine located forwardly of a main spar, have not proven practicable. While the design may be such that the engine may be located wholly between two ribs 15, this may not always be practicable, and if it becomes necessary to interrupt a rib truss, it is preferable that the interruption occur in the secondary trussing to the rear of the main spar, rather than in the primary trussing forwardly thereof.

While the engine and the propeller shaft have herein been shown as supported independently, each from the wing structure, and the engine as rigidly mounted upon the wing structure, it may be desirable in some instances to mount the assembly resiliently, or as flexibly connected units, or as a single unit, movable as a unit to a limited extent relative to the wing structure, and such a mounting and assembly is within the intent of this invention.

It will also be noted that the bearing at 50 for the propeller shaft and propeller subassembly is located closely adjacent the center of mass of this subassembly as a whole, the point of application of the moment P being closely adjacent to the bearing 50, and in this way unbalanced dynamic forces and whipping of the propeller shaft are largely minimized.

In Figure 4 the wing structure includes a secondary spar 7, disposed ahead of the main spar 1. The several elements are so arranged, in this structure, that the neutral point of the gravitational moments acting upon the power plant assembly are disposed somewhat ahead of, but still adjacent the neutral axis N of the wing, as indicated at R. This imposes a somewhat greater radial load on the bearing at 50, and thence through the structure upon the main spar 1, but the secondary spar assists in resisting this load, and the power plant moments are mainly resisted in or near the neutral axis N. In Figure 5 the secondary load is more directly applied to the secondary spar 7 by supporting the bearing 51 from this secondary spar. Again, the wing's neutral axis may be between the spars, as at R, Figure 4, and yet by assembling the power plant so that the neutral point of the moments acting upon its several components is located at or adjacent such neutral axis of the wing, as at R, the advantages of my invention may still be realized.

In Figure 6 the propeller shaft is broken, the main propeller shaft 5 being carried in bearings 50 and 52, the latter carried by the main spar 1, and terminates in a universal joint 53. A short connecting shaft 54 connects the joint 53, through a second universal joint 55, with the engine 4. Nevertheless, the moments upon the structure developed by the propeller and its shaft, and by the engine, are balanced substantially in the wing's neutral axis N, wherever such neutral axis may be located, in accordance with the principles of this invention.

The assembly herein disclosed not only provides a lighter and better construction of the wing and power plant assembly, and a better relationship of the parts thereof to each other, but has a further advantage in that it provides a more balanced arrangement of the other parts of the airplane, and there is no unbalanced or overhanging mass forwardly of the wing which requires a corresponding balancing force to the rear of the neutral axis of the wing.

What I claim as my invention is:

1. In combination with an airplane wing incorporating a main spar disposed adjacent the wing's neutral spanwise axis, and appropriate bracing structure reacting from such spar, an engine disposed within and supported from the wing, behind the neutral axis, a propeller disposed ahead of the wing's leading edge, and a propeller shaft extending between the engine and the propeller, and supported from the wing.

2. In combination with an airplane wing incorporating a main spar disposed adjacent the wing's neutral spanwise axis, and appropriate bracing structure reacting from such spar, an engine disposed within the wing behind such neutral axis, a propeller disposed ahead of the wing's leading edge, a propeller shaft extending between the propeller and engine, to constitute a power plant assembly, such assembly being formed as a substantially rigid beam, balanced adjacent the wing's said neutral axis, and means to support such assembly from the wing.

3. In combination with an airplane wing incorporating a main spar disposed adjacent the wing's neutral spanwise axis, and appropriate bracing structure supported from such spar, an engine disposed within the wing behind such neutral axis, a propeller disposed ahead of the wing's leading edge, and a propeller shaft operatively connecting the engine and the propeller, to constitute a power plant assembly, and means to support the elements of such power plant assembly from the wing, the several elements producing individual moments which are substantially balanced at opposite sides of such neutral axis.

4. In combination with an airplane wing which per se is subjected to stresses centralized along a neutral axis between its leading and trailing edges, an engine disposed within and supported from the wing, behind the neutral axis, a propeller disposed ahead of the leading edge of the wing, a propeller shaft supporting the propeller and operatively connecting the same with the engine, and supported from the wing, the moments acting upon the engine and upon the propeller and shaft being substantially balanced adjacent the neutral axis of the wing.

5. In combination with an airplane wing which per se is subjected to stresses centralized along a neutral axis between its leading and trailing edges, an engine disposed within and supported from the wing, at one side of such neutral axis, a propeller disposed exteriorly of the wing, at the opposite side of the neutral axis, a propeller shaft supporting the propeller and operatively connecting the same with the engine, the moments acting upon the wing through the engine and through the propeller and shaft being substantially balanced adjacent the wing's neutral axis.

6. In combination with an airplane wing having a main spar disposed between its leading and trailing edge, in the vicinity of the wing's neutral axis, an engine disposed within the wing behind the spar, a propeller shaft projecting forwardly from the engine to a point in advance of the wing's leading edge, and supported from the wing, and a propeller carried upon the forward end of said shaft, the moments developed by the engine and by the propeller and shaft, respectively, and applied to the wing through their supports, being substantially balanced in the vicinity of the wing's neutral axis.

EDWARD C. WELLS.